United States Patent [19]

Iscol et al.

[11] 4,112,414
[45] Sep. 5, 1978

[54] HOST-CONTROLLED FAULT DIAGNOSIS IN A DATA COMMUNICATION SYSTEM

[75] Inventors: Lewis Iscol, Berkeley; Lynn E. Cochran, San Mateo, both of Calif.

[73] Assignee: Chevron Research Company, San Francisco, Calif.

[21] Appl. No.: 756,528

[22] Filed: Jan. 3, 1977

[51] Int. Cl.² .......................... G06F 11/04; H04B 3/46
[52] U.S. Cl. ....................... 340/146.1 E; 179/175.3 R; 235/302
[58] Field of Search ................ 340/146.1 E, 146.1 BE; 235/153 AK; 179/175.3 R

[56] References Cited
U.S. PATENT DOCUMENTS

| | | |
|---|---|---|
| 3,787,810 | 1/1974 | Wiggins et al. ............... 340/146.1 E |
| 3,819,878 | 6/1974 | Pine et al. ..................... 179/175.3 R |
| 3,943,348 | 3/1976 | Akriche et al. ........ 340/146.1 BE X |
| 4,001,559 | 1/1977 | Osborne et al. .......... 340/146.1 E X |

*Primary Examiner*—Jerry Smith
*Attorney, Agent, or Firm*—Ralph L. Freeland, Jr.; Harold D. Messner

[57] ABSTRACT

In the present invention, the problem of rapidly diagnosing faults in a data communication system is addressed and solved by incorporating one or more diagnostic networks which are controlled by a properly programmed host computer, and which enable the host computer itself to rapidly test the correct functioning of selected portions of the data communication system.

5 Claims, 3 Drawing Figures

HOST-CONTROLLED FAULT DIAGNOSIS IN A DATA COMMUNICATION SYSTEM

FIELD OF THE INVENTION

The present invention relates to data communication systems comprised of one or more host computers, one or more terminals which communicate with a host computer, one or more communication circuit elements supplied by a common carrier tariffed by the Federal Communications Commission (FCC) and other circuit elements supplied by nontariffed vendors, such as modems, compactors and multiplexors which contribute to the correct and efficient operation of the system. In particular, the invention relates to the rapid determination of which component or circuit element has failed in the event of a system fault.

BACKGROUND OF THE INVENTION

Present-day society is becoming increasingly dependent upon data communication systems. In the event of the failure of such a system, workers and facilities frequently stand idle for considerable periods of time. Rapid restoration of service is thus a matter of considerable economic significance. Determining which particular component or circuit element of the system has failed is typically done by an expert skilled in the design and operation of one or more circuit elements of the system, and is frequently much more time-consuming and error-prone than is desirable. In practice, the difficulty of prompt diagnosis of system faults is compounded by the fact that the circuit elements comprising most data communication systems are supplied by different manufacturers and vendors. If the wrong vendor is mistakenly called on to provide repair service, the actual restoration of service may be delayed by hours or days. As data communication systems have become increasingly complex, a systems analyst becomes less and less able to rapidly and accurately diagnose the cause of a system failure.

OBJECT OF THE INVENTION

The object of the invention is the provision of a novel method and system for rapidly and accurately diagnosing the cause of failure of a data communication system.

SUMMARY OF THE INVENTION

In the transfer of digital data between a host computer and a remote data terminal via a data communication system that includes one or more circuit elements supplied by a common carrier tariffed by the FCC, the present invention provides automatic diagnosing of faults within the system. It preferably comprises a series of digital logic loopback networks, each individually connected in parallel between the transmit and receive portions of the data communication system at the terminals of the various data handling circuit elements of the communication system. Each logic network operates in selective and independent fashion in response to digital addressing signals sent by the properly programmed host computer; thereafter other digital signal patterns sent from the host computer enable the computer itself to test the integrity of data transmission through each circuit element of the communication system by looping back those digital signals to the computer. Each set of digital addressing signals can be uniquely associated with one and only one of the circuit elements.

BRIEF DESCRIPTION OF THE DRAWINGS

Other advantages, objects and attributes of the invention will become more apparent from a description of an embodiment thereof in which the following Figures appear, to wit:

FIG. 3 is a program listing of the host computer program which was used in conjunction with the operations of the present invention.

AN EMBODIMENT OF THE INVENTION

Figure 1:
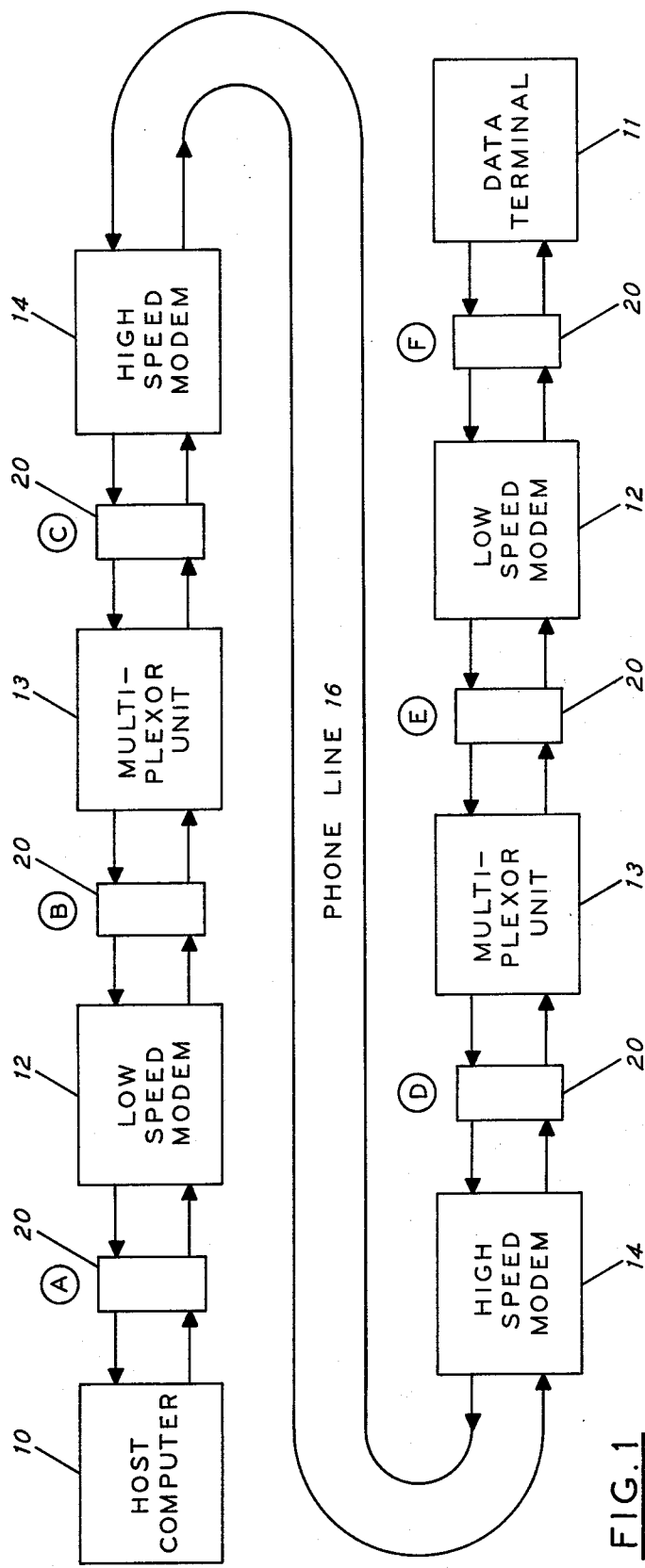
FIG. 1 is a schematic diagram of a data communication system in which the present invention is particularly useful.

Refer now to FIG. 1, in which a host computer 10 is shown connected to a data terminal 11 via a series of circuit elements, viz., a pair of low-speed modems 12, a pair of multiplexor units 13 (which typically have more than the single low-speed input here shown), a pair of high-speed modems 14, and a telephone line 16. It may be appreciated that rapid and accurate diagnosis of a system failure is important. Experience has shown in accordance with the present invention that such diagnosis can be provided quickly, accurately and rapidly by installing a series of loopback networks 20 of the present invention at points A, B, C, D, E and F, as shown; i.e., at the output terminals of each of the circuit elements. When each network 20 is energized to locate a fault, the host computer 10 first signals the diagnostic network 20 of interest, say at A, to assume a loopback mode, as explained below; thereafter other digital signals — in a predetermined pattern — are sent from the host computer; those system circuit elements more remote from the host computer are left isolated; and the data pattern that is rerouted back to the host by network 20 at Point A is checked against itself for accuracy at the computer. After the network 20 at A is inactivated by the host taking it out of the loopback mode, the host places a similar network, say at B, into a like loopback mode, and the process repeated. By proceeding this way, the host may rapidly and accurately determine between which two loopback networks the fault lies.

Figure 2:
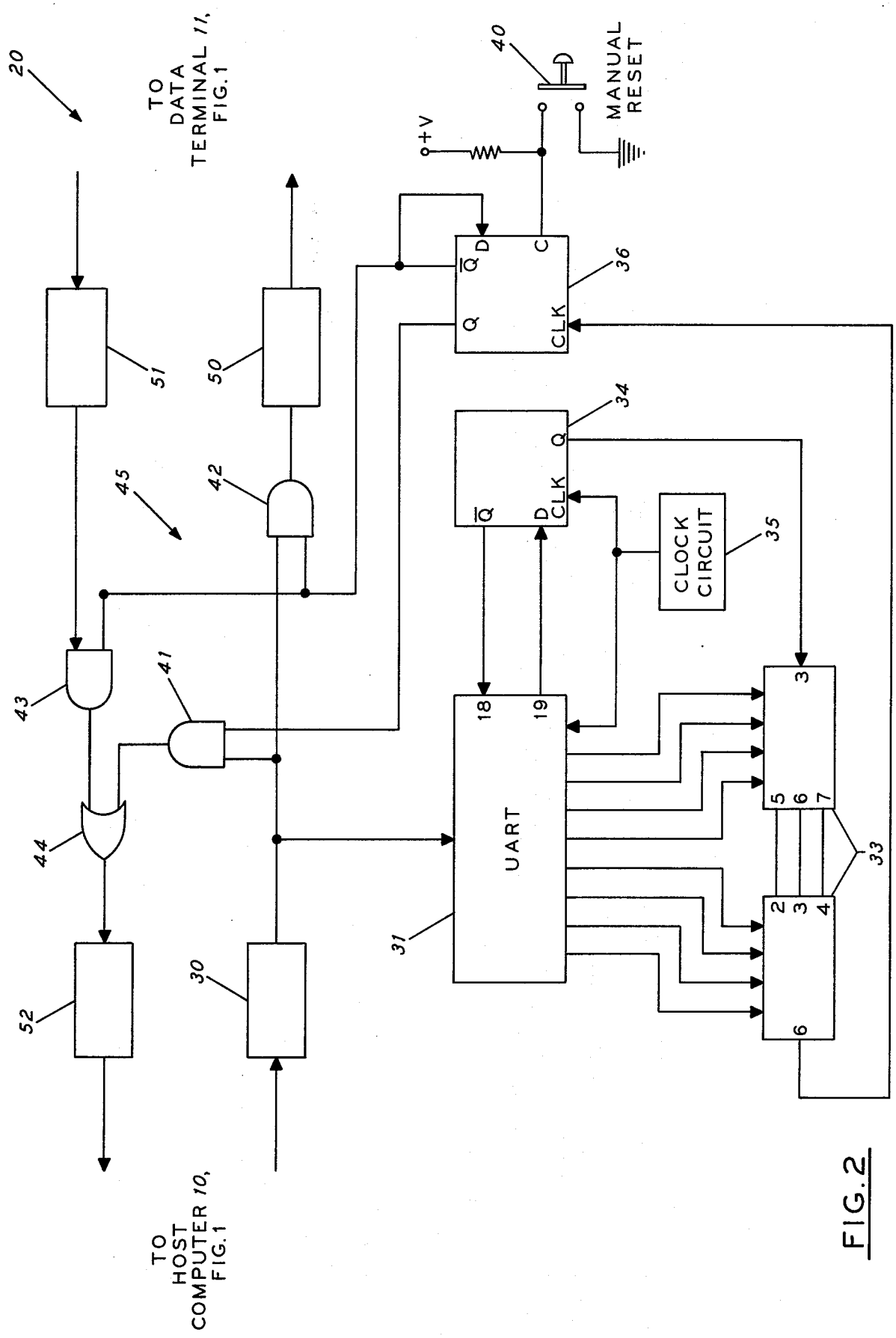
FIG. 2 is a detailed schematic diagram of a prototype of the present invention.

FIG. 2 illustrates a diagnostic loopback network 20 in detail.

The operations code from the host computer initiates operation of the decoder network 20 as follows: it first energizes integrated circuit (IC) chip 30, which converts electrical levels of the signal from the EIA standard to those required by the following transistor-transistor logic (TTL) elements. The converted operational signal first activates IC chip 31, a Universal Asynchronous Receiver-Transmitter (UART), whose main task is to internally store the data bits which make up the operations code as they are presented serially by IC chip 30, and then finally present all 8 bits in parallel to comparator chips 33. IC chip 34 is a D-type flip-flop whose function is to disable the comparison operation while the output of IC chip 31 is in the process of changing state. Clock circuit 35 is standard, and is needed for the proper operation of IC chips 31 and 34.

IC chips 33 are comparators that compare the operations code which was received to a predetermined bit configuration, in this case 0001 1110. When this particular operations code is received, a pulse is sent to IC chip 36, a D-type flip-flop. When the output, Q, from IC chip 36 is high, then the diagnostic network 20 is in the loopback mode. When the output Q is low, then the diagnostic network 20 is in the normal mode and the output $\overline{Q}$ is high. Each time the special operations code is received, the diagnostic network, and in particular flip-flop 36, flips from the one mode to the other mode. Manual reset button 40 can be pressed at any time. The diagnostic network 20 is then forced into the normal mode at that time.

The Q and $\overline{Q}$ outputs from IC chip 36 are used to control the operation of the three AND gates 41, 42 and 43, comprising, along with OR gate 44, a gate network 45 that controls signal flow to and through each diagnostic network 20. Specifically, when in normal mode, gate 41 is disabled while gates 42 and 43 are enabled. Thus, signals which enter through level converting chip 30 exit through level converting chip 50, to data terminal 11, FIG. 1; signals which enter via level converting chip 51 exit via level converting chip 52. On the other hand, when in loopback mode, gate 41 is enabled while gates 42 and 43 are disabled. Thus, signals passing through IC chip 30 exit via IC chip 52; no signals pass through IC chip 50; similarly, signals which enter through IC chip 51 are not transmitted past gate 43. The OR gate 44 accepts signals from either gate 41 or gate 43, which signals then pass to IC chip 52.

FIG. 3 illustrates a computer program which has been executed in the properly programmed host computer 10 of FIG. 1 to test the operation of the diagnostic network 20 of FIG. 2. In this program, the special operations code which causes change of mode in a single diagnostic network 20 consists of one character, and is called "TOGGLE." The program transmits four characters, "ABCD," followed by the single character "TOGGLE," followed by a second group of four characters "EFGH," followed by the operations code word "TOGGLE," followed by a third character set "IJKL." Proper operation is demonstrated by the characters "ABCD" proceeding to the terminal beyond the loopback network 20, the characters "EFGH" looping back to the host computer, and characters "IJKL" again proceeding to the terminal.

In this case, the host computer is a IBM 370/68.

Note that in FIG. 3 the command "TOGGLE" in effect flips the network 20 of FIG. 2 from one mode to the other mode independent of its previous state. Thus, assuming the network 20 started in the normal state, the first-mentioned operations code command (i.e., "TOGGLE") of FIG. 3 places the network 20 in a loopback mode while the second command returns the system to its normal operating mode.

CONCLUSION

The invention is not limited to the above combinations of elements and steps, inasmuch as substitutions are readily apparent to those skilled in the art. For example, synchronous as well as asynchronous data protocols might be employed within the data communication system to which this invention relates. Bisynchronous (BSC) or Synchronous Data Link Control (SDLC) are examples, and may enable the host computer to operate in a similar but slightly different manner than previously discussed. Such protocols may require that each loopback network engage in a predetermined dialog with the host computer in order to establish control by the latter. Also, the loopback network itself may be packaged as part of a data handling element in the data communication system, such as within a modem, concentrator, compactor, multiplexor, data service unit, or terminal. Also, each diagnostic network, upon command by the host computer, may perform a diagnostic logic function different from loopback. For example, a test signal could be generated upon interrogation, and that signal measured by other equipment controlled by the host computer; moreover, the network itself may take measurements and send the results back to the host computer for analysis; or it may loop back the analog circuit rather than a digital interface, as discussed above. Thus, the invention is to be given the broadest interpretation within the terms of the following claims.

What is claimed is:

1. In the transfer of digital data between a host computer and one or more remote data terminals via a data communication system that includes one or more circuit elements supplied by a common carrier tariffed by the Federal Communications Commission and other circuit elements supplied by tariffed or nontariffed vendors, the improvement for automatically determining which of said circuit elements of said data communication system in a nonoperative state is faulty, comprising one or more diagnostic networks inserted logically between said elements of said data communication system, each selectively and independently operative in response to digital signals generated by and sent from a properly programmed host computer, said one or more diagnostic networks being selectively addressable using digital signals having the same protocol as said host computer uses in addressing said one or more data terminals of said data communication system, said one or more diagnostic networks each including first means for continuously monitoring all digital signals generated by said host computer and second means interconnected to said first means and selectively operating in response thereto to engage in an exchange of protocol and other messages with said host computer whereby said programmed host computer can determine rapidly which element of said data communication system is faulty.

2. The improvement of claim 1 in which each of said diagnostic networks is inserted into said communication system at an interface specified by Electronic Industries Association Standards and is controlled by said properly programmed host computer by response to a string of one or more predetermined digital characters comprising a portion of said digital signals.

3. The improvement of claim 1 in which said each logic network circuit includes (i) an asynchronous transmit/receive circuit having an input connected to a transmit conductor of said system; (ii) a source of clocking pulses connected to said transmit/receive circuit for outputting in parallel format said digital signals originating from said properly programmed host computer; (iii) a comparitor circuit connected to said source of clocking pulses for comparing said digital signals with a series of data address bits pre-programmed at said comparitor circuit and providing a loopback digital gating code; and (iv) a gating network enabled by said gating code to loop back a transmitted pattern of digital characters from said host computer back thereto.

4. In the transfer of digital data between a host computer and one or more remote data terminals via data communication system that includes one or more circuit elements supplied by a common carrier tariffed by the Federal Communications Commission, as well as other circuit elements supplied by tariffed or nontariffed vendors, the method for automatically determining which of said circuit elements of said data communication system in a nonoperative state is faulty, comprising inserting one or more diagnostic networks between said elements of said data communication system, and selectively operating each network in response to digital signals sent out by said host computer, said digital signals used in addressing each said diagnostic network being of the same protocol as said host computer uses in addressing said one or more data terminals in said data communication system, whereby said host computer can rapidly determine which element of said data communication system is faulty.

5. The method of claim 4 in which said digital signals include (i) a digital loopback character code which places said one or more diagnostic networks in a loopback mode, and (ii) a series of digital characters sent by said host computer on outgoing conductors connected thereto and routed directly back to said host on incoming conductors connected thereto, thus enabling said host to test the integrity of data transmission over that portion of said data communication system lying between said host computer and each said diagnostic network.

* * * * *